(12) United States Patent
Sugahara

(10) Patent No.: US 7,945,435 B2
(45) Date of Patent: May 17, 2011

(54) SEARCH METHOD, SEARCH SYSTEM, AND SEARCH PROGRAM

(75) Inventor: Hiroto Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 844 days.

(21) Appl. No.: 11/912,002

(22) PCT Filed: Apr. 13, 2006

(86) PCT No.: PCT/JP2006/307827
§ 371 (c)(1),
(2), (4) Date: Oct. 19, 2007

(87) PCT Pub. No.: WO2006/115068
PCT Pub. Date: Nov. 2, 2006

(65) Prior Publication Data
US 2009/0076788 A1 Mar. 19, 2009

(30) Foreign Application Priority Data
Apr. 19, 2005 (JP) ................................. 2005-121109

(51) Int. Cl.
*G06F 9/44* (2006.01)
(52) U.S. Cl. ........................................... 703/20
(58) Field of Classification Search .................... 703/20, 703/21
See application file for complete search history.

(56) References Cited

U.S. PATENT DOCUMENTS

| 2002/0007269 | A1* | 1/2002 | Gao ............................... 704/212 |
| 2003/0182095 | A1 | 9/2003 | Saito et al. |
| 2004/0044468 | A1* | 3/2004 | Adachi .......................... 701/208 |
| 2004/0127224 | A1 | 7/2004 | Furukawa et al. |
| 2005/0249278 | A1* | 11/2005 | Sasai et al. ................ 375/240.03 |

FOREIGN PATENT DOCUMENTS

| EP | 1 414 257 A1 | 4/2004 |
| JP | 2002-044034 | 2/2002 |
| JP | 2003-242303 | 8/2003 |
| JP | 2003-274444 | 9/2003 |
| JP | 2003-309868 | 10/2003 |
| JP | 2004-096266 | 3/2004 |
| JP | 2004-201269 | 7/2004 |
| JP | 2004-356873 | 12/2004 |

* cited by examiner

*Primary Examiner* — Jason Proctor
*Assistant Examiner* — Andre Pierre Louis
(74) *Attorney, Agent, or Firm* — Dickstein Shapiro LLP

(57) ABSTRACT

A non-sensitive building is extracted according to radio environment data indicating the current condition of the radio communication environment in the search target area and digital map data including attribute information concerning the buildings in the search target area, thereby acquiring attribute information corresponding to the non-sensitive building. The known use condition data on target radio communication system or the similar system and the digital map data are used to obtain an equation for estimating the affect given to the effect of benefits by the attribute information parameter. According to the extracted non-sensitive building attribute information and the obtained equation, the effect obtained by performing the non-sensitive area countermeasure to each of the non-sensitive buildings is estimated. The priority of performing the non-sensitive area countermeasure is decided in accordance with the effect scale.

20 Claims, 9 Drawing Sheets

FIG. 3

| | LOCATION | TENANT | | | | | | | USE CONDITION | |
| | | OFFICE | | | PUBLIC PLACE | | | | | |
| | | FINANCE | TRANSPORT | MANUFACTURE | ... | FOOD | FASHION | ... | CALL REQUEST | HOLD TIME |
| A BUILDING | SHINJUKU-KU | 7362 | 0 | 0 | ... | 634 | 943 | ... | 48 | 8.28 |
| B HOTEL | SHIBUYA-KU | 0 | 0 | 0 | ... | 1394 | 0 | ... | 32 | 12.32 |
| C PLAZA | MINATO-KU | 1208 | 1290 | 2875 | ... | 584 | 0 | ... | 84 | 9.23 |
| ... | ... | ... | ... | ... | ... | ... | ... | ... | ... | ... |

| NAME | ADDRESS | NON-SENSITIVE AREA | ESTIMATED PROFIT | TENANT |
|---|---|---|---|---|
| SS BUILDING | SHINJUKU 2-CHOME, SHINJUKU-KU... | ALL FLOORS | 7,640 | 1F:RESTAURANTS,2F~7F:SERVICE,... |
| GR BUILDING | SHINJUKU 1-CHOME, SHINJUKU-KU... | ALL FLOORS | 4,992 | B1~5F:SPECIALTY SHOPS,6F~7F:RESTAURANTS... |
| F HOTEL | SHINJUKU 3-CHOME, SHINJUKU-KU... | 1F~7F | 4,628 | 1F:LOBBY,2F~3F:HALL,4F~12F:GUEST ROOMS... |
| ... | ... | ... | ... | ... |

SEARCH METHOD, SEARCH SYSTEM, AND SEARCH PROGRAM

TECHNICAL FIELD

The present invention relates to extraction of the places considered as radio non-sensitive area (outside the service area) of a radio access network (RAN) such as a mobile phone, and to a search method, a search system, and a search program for efficiently specifying the place among the non-sensitive area, which needs to take a countermeasure at an early stage.

BACKGROUND ART

The recent mobile phone market has been in an active changeover from the conventional second-generation system to the third-generation system that is capable of providing communications of still higher speed and higher quality. In accordance with this, there has been an expansion in the service area of the third-generation system.

With the second-generation system, most of the areas are covered basically by outdoor base stations that are placed on the rooftops of buildings or the like, and indoor base stations are placed to secure the area only for the underground and a part of large-scaled buildings which are not covered by the outdoor base stations.

However, the frequency of 2 GHz band used in the third-generation system provided by a part of communication companies is higher than the frequency used in the second-generation system, so that there is a large loss caused due to transmission or diffraction of the radio waves. Thus, buildings where the radio waves cannot reach the inside thereof (non-sensitive buildings) are being built even at this point where the outdoor base stations for the third-generation system are basically set ready for the first round. Considering the use condition of the mobile phone users, however, most of outgoing and incoming calls are sent and received indoors. Therefore, expansion of the service into the indoor areas has become the recent central topic for the third-generation system.

For dealing with the non-sensitive area inside the buildings, an indoor base station may be provided inside the non-sensitive building, or a small-scaled base station may be provided in the peripheral area of the non-sensitive building as the countermeasure to be taken. As mentioned above, actions taken for dealing with the non-sensitive area by taking some kinds of countermeasures are referred to as non-sensitive area countermeasures. The communication company needs to make an investment to take a non-sensitive area countermeasure, so that it is necessary for the communication company to make sure which building is worth the investment. However, there are a large number of non-sensitive buildings for the third-generation system particularly in urban districts. Thus, it takes a lot of time and effort to specify the building that is worth the investment (to place a base station) among those buildings.

In order for the communication company to determine the building that is worth the investment among the number of non-sensitive buildings in an effective way, it is desirable to quantize the effects for the communication company, which may be obtained by taking the non-sensitive area countermeasure indoors, and to put the priority order based on the quantized effects. However, there is no technique provided for the tools used in the conventional RAN designing, for quantizing the effects for the communication company, which may be obtained by taking the non-sensitive area countermeasure.

Examples of the conventional RAN design tools are Atoll (a product of Forks Inc.), A-SVS (a product of ACTIX), and Capesso (a product of Symena). These tools are used for designing RAN that is already decided to be built, optimization and maintenance of RAN that is already being used, etc. Therefore, although a part of the tools has a function of calculating the "investment" made for the non-sensitive area countermeasure, such as calculating the cost for the equipment to be placed, those tools are not provided with a function of quantizing the effect for the communication company, which may be obtained by taking the non-sensitive area counter measure.

Further, although Patent Document 1 discloses a method for designating a potential site that needs to take a countermeasure by the use of demographic statistics, traffic statistics, or the like, it does not disclose a method for quantizing the effect obtained by placing the base station as in the conventional technique described earlier.

Furthermore, turning to the designing tools for networks other than RAN, there is Ativa Research Tool (a product of Telecom petition). This tool performs analysis and estimation of a next-generation network while considering time/spatial elements. This tool is provided with a function of estimating a profit as the effect obtained by building a network. However, this is a tool targeting at a large-scaled area such as a city level or a district level, so that it cannot be applied to estimation on the basis of a building level for the indoor non-sensitive area countermeasure that is the issue herein.

Patent Document 1: Japanese Unexamined Patent Publication 2003-309868

DISCLOSURE OF THE INVENTION

Means for Solving the Problems

As described above, in any of the conventional techniques, there is no means provided for quantizing the effect that can be obtained by the communication company through taking the non-sensitive area countermeasure for the non-sensitive buildings. Thus, it takes a lot of time and effort for the communication company to select the building that needs to take the measure among the number of non-sensitive buildings. Therefore, the RAN designing work from the search for non-sensitive areas to determining whether or not to place a base station has been inefficient.

An object of the present invention therefore is to provide a search method, a search system, and a search program, which can improve the shortcomings of the conventional techniques, easily quantize the effect that is obtained by the communication company through taking a non-sensitive area countermeasure for the non-sensitive building, and efficiently specify the place that needs to take the measure at an early stage.

In order to achieve the foregoing object, a search system of the present invention is a search system for searching, within a spatially expanded evaluation-target area, a radio non-sensitive area where a radio wave of an already-provided radio communication system cannot reach sufficiently. The search system uses as data used for the search, radio environment data, digital map data, and use condition data, wherein:

the radio environment data is current radio environment data of the radio communication system in the evaluation-target area, and each of the radio environment data is individually correlated to search targets within the evaluation-target area;

the digital map data is digital map data including the evaluation-target area, which contains individual area attribute information for the search targets; and the use condition data is use condition data of the radio communication system or a radio communication system similar to the radio communication system, and each of the use condition data is individually correlated to already-provided service areas as well as to parameters of attribute information of the search targets. The search system includes:

a non-sensitive area extracting device which extracts the search targets and obtains the attribute information of the search targets by correlating the radio environment data to the attribute information of the search targets;

an effect quantization equation creating device which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing device which calculates the effect that the communication company obtains by making the area where the search targets exist into its service area through applying the calculating equation to the extracted search targets, and applies an priority order for taking a search-target countermeasure on a plurality of the search targets extracted within the evaluation-target area based on the effects calculated individually.

With the present invention, the non-sensitive area extracting device extracts the search targets and obtains the attribute information of the targets. Then, the effect quantization equation creating device creates the calculating equation for quantizing an effect that the communication company obtains by making an area where the search targets exist into its service area, by having the parameters of the attribute information of the search targets as direct or indirect explanatory variables based on the obtained information. Further, the effect quantizing device calculates the effect that the communication company obtains by making an area where the search targets exist into its service area through applying the calculating equation to the extracted search targets, and applies the priority order for taking a search-target countermeasure on a plurality of search targets extracted within the evaluation-target area based on the effects calculated individually.

As described above, the effect the communication company obtains by taking the non-sensitive area countermeasure can be easily quantized with the present invention, so that the place that needs to take a countermeasure at an early stage can be specified efficiently.

In the above explanations, the radio environment data, the digital map data, and the use condition data are employed as the data to be used for the search. However, the present invention is not limited to that case. The digital map data and the use condition data may be used as the search data, and the radio environment data may be calculated based on such information. In that case, a search system of the present invention is configured as a search system for searching, within a spatially expanded evaluation-target area, a radio non-sensitive area where a radio wave of an already-provided radio communication system cannot reach sufficiently. The search system uses as data used for the search, digital map data, and use condition data, wherein:

the digital map data is digital map data including the evaluation-target area, which contains positional information and characteristic information for the search targets that exist within the evaluation-target area and attribute information for each of the search targets within the evaluation-target area; and the use condition data is use condition data of the radio communication system or a radio communication system similar to the radio communication system, and each of the use condition data is individually correlated to already-provided service areas as well as to parameters of attribute information of the search targets. The search system includes:

a radio environment estimating device which outputs radio environment data for the evaluation-target area through performing radio propagation estimation in the evaluation-target area by using the positional information and the characteristic information of the search targets;

a non-sensitive area extracting device which extracts the search targets and obtains the attribute information of the search targets by correlating the radio environment data to the attribute information of the search targets;

an effect quantization equation creating device which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing device which calculates the effect that the communication company obtains by making the area where the search targets exist into its service area through applying the calculating equation to the area where the extracted search targets exist, and applies an priority order for taking a search-target countermeasure on a plurality of the search targets extracted within the evaluation-target area based on the effects calculated individually.

In the above explanations, the present invention is configured as the systems. However, the present invention may also be configured as a search method. A search method of the present invention is configured as a search method for searching, within a spatially expanded evaluation-target area, a radio non-sensitive area where a radio wave of an already-provided radio communication system cannot reach sufficiently. The search method uses as data used for the search, radio environment data, digital map data, and use condition data, wherein:

the radio environment data is selected as current radio environment data of the radio communication system in the evaluation-target area, each of the radio environment data being individually correlated to search targets within the evaluation-target area;

the digital map data is selected as digital map data including the evaluation-target area, which contains respective area attribute information for the search targets; and the use condition data is selected as use condition data of the radio communication system or a radio communication system similar to the radio communication system, each of the use condition data being individually correlated to already-provided service areas as well as to parameters of attribute information of the search targets. The search method includes:

a non-sensitive area extracting step which extracts the search targets and obtains the attribute information of the search targets by correlating the radio environment data to the attribute information of the search targets;

an effect quantization equation creating step which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing step which calculates the effect that the communication company obtains by making an area where the search targets exist into its service area through applying the calculating equation to the extracted search targets, and applies an priority order for taking a search-target countermeasure on a plurality of search targets extracted within the evaluation-target area based on the effects calculated individually.

Further, when the digital map data and the use condition data are used as the search data, and the radio environment data is calculated based on such information, a search method of the present invention is configured as a search method for searching, within a spatially expanded evaluation-target area, a radio non-sensitive area where a radio wave of an already-provided radio communication system cannot reach sufficiently. The search method uses as data used for the search, digital map data, and use condition data, wherein:

the digital map data is set as digital map data including the evaluation-target area, which contains positional information and characteristic information for the search targets that exist within the evaluation-target area and attribute information for each of the search targets within the evaluation-target area; and the use condition data is set as use condition data of the radio communication system or a radio communication system similar to the radio communication system, each of the use condition data being individually correlated to already-provided service areas as well as to parameters of attribute information of the search targets. The search method includes:

a radio environment estimating step which outputs radio environment data for the evaluation-target area through performing radio propagation estimation in the evaluation-target area by using the positional information and the characteristic information of the search targets;

a non-sensitive area extracting step which extracts the search targets and obtains the attribute information of the search targets by correlating the radio environment data to the attribute information of the search targets;

an effect quantization equation creating step which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing step which calculates the effect that the communication company obtains by making the area where the search targets exist into its service area through applying the calculating equation to the area where the extracted search targets exist, and applies an priority order for taking a search-target countermeasure on a plurality of the search targets extracted within the evaluation-target area based on the effects calculated individually.

In the above explanations, the present invention is configured as the system or the method. However, the present invention may also be configured as a program for controlling a computer. In that case, a search program according to the present invention is configured as a program to be used in a computer that is included in a search system for searching, within a spatially expanded evaluation-target area, a radio non-sensitive area where a radio wave of an already-provided radio communication system cannot reach sufficiently. The search program uses, as input information:

current radio environment data of the radio communication system in the evaluation-target area, each of the radio environment data being individually correlated to search targets within the evaluation-target area;

digital map data including the evaluation-target area, which contains individual area attribute information for the search targets; and use condition data of the radio communication system or a radio communication system similar to the radio communication system, each of the use condition data being individually correlated to already-provided service areas as well as to parameters of attribute information of the search targets. The search program executes:

a function which extracts the search targets and obtains the attribute information of the search targets by correlating the radio environment data to the attribute information of the search targets;

a function which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and a function which calculates the effect that the communication company obtains by making the area where the search targets exist into its service area through applying the calculating equation to the extracted search targets, and applies an priority order for taking a search-target countermeasure on a plurality of search targets extracted within the evaluation-target area based on the effects calculated individually.

Further, when the digital map data and the use condition data are used as the search data, and the radio environment data is calculated based on such information, a search program according to the present invention is configured as a search program to be used in a computer that is included in a search system for searching, within a spatially expanded evaluation-target area, a radio non-sensitive area where a radio wave of an already-provided radio communication system cannot reach sufficiently. The search program uses, as input information:

digital map data including the evaluation-target area, which contains positional information and characteristic information for the search targets that exist within the evaluation-target area and attribute information for each of the search targets within the evaluation-target area; and use condition data of the radio communication system or a radio communication system similar to the radio communication system, each of the use condition data being individually correlated to already-provided service areas as well as to parameters of attribute information of the search targets. The search program executes:

a function which outputs radio environment data for the evaluation-target area through performing radio propagation estimation in the evaluation-target area by using the positional information and the characteristic information of the search targets;

a function which extracts the search targets and obtains the attribute information of the search targets by correlating the radio environment data to the attribute information of the search targets;

a function which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and a function which calculates the effect that the communication company obtains by making an area where the search targets exist into its service area through applying the calculating equation to the area where the extracted search targets exist, and applies an priority order for taking a search-target countermeasure on a plurality of search targets extracted within the evaluation-target area based on the effects calculated individually.

Further, as a modification example, the present invention may be configured as follows. That is, the search method of the present invention is a search method for searching a radio non-sensitive area where a radio wave of an already-provided radio communication system cannot reach sufficiently. In order to achieve aforementioned object, in particular, the search method prepares, in advance:

a radio environment database that stores data for specifying each district within a search-target area and current radio environment data of the radio communication system in each of the districts in a correlated manner;

a digital map database that stores data for specifying each of the districts in map data including the search-target area, and attribute information of each of the districts in a correlated manner; and a use condition database that stores use condition data of a district where it has already become possible to use the radio communication system or a radio communication system similar to the radio communication system, and attribute information that corresponds to the use condition data. The search method:

correlates the radio environment data read out from the radio environment database and the attribute information read out from the map database based on the data for specifying each of the districts, and extracts a district where the corresponding radio environment data indicates as a radio non-sensitive area and the attribute information that corresponds to the district;

correlates the use condition data read out from the use condition database and the attribute information read out from the map database based on the attribute information of each of the districts, and obtains a calculating equation for quantizing an effect that a communication company obtains from the radio communication system, by having parameters configuring the attribute information as explanatory variables; and calculates the effect that the communication company obtains from each of the districts by making each of the districts extracted as the radio non-sensitive area into a service available district of the radio communication system based on the parameters of the attribute information of each of the districts extracted as the radio non-sensitive area and the calculating equation; and applies a priority order for taking a radio non-sensitive area countermeasure on each of the districts extracted as the radio non-sensitive area in accordance with degrees of the obtained effects.

The calculating equation for quantizing the effect the communication company can obtain is found based on the relation between the use condition data (the number of call requests, the line hold time, and the like) of the district where the use of the target radio communication system (the radio communication system for the third-generation mobile phones) or the radio communication system (the radio communication system for the second-generation mobile phones or prior to those) which is similar to the target communication system has become available and the attribute information that corresponds to the use condition data, i.e. based on the relation between the actually achieved use results and the attribute information that affects the results. Thus, through applying the attribute information of the district that is the radio non-sensitive area into the calculating equation, it is possible to exactly predict the effect that the communication company can obtain by making the non-sensitive area into the service available district of the radio communication system.

As a specific method for obtaining the calculating equation, it is possible to use the principle component analysis, the factor analysis, or the like, for example.

Furthermore, it becomes possible to efficiently specify the district that needs to take a nom-sensitive area countermeasure at an early stage through: applying the attribute information of each of the districts extracted from the search-target area as the radio non-sensitive area into the calculating equation; calculating all the effects (for each district) that the communication company can obtain by making the district that is currently the radio non-sensitive area into the service available district of the radio communication system; and applying the priority order for taking the radio non-sensitive area countermeasure on each of the districts in accordance with the degrees of the obtained effects.

The scale of the district as an individual evaluation target within the search-target area is determined optionally. For example, it is possible to handle each building as a single district.

Further, in order to achieve the similar object as the one mentioned above, the search method may be configured to prepare, in advance:

a digital map database that stores information for specifying positions and shapes of buildings within a search-target area and attribute information of each district within the search-target area in a correlated manner; and a use condition database that stores use condition data of a district where it has already become possible to use the radio communication system or a radio communication system similar to the radio communication system, and attribute information that corresponds to the use condition data. The search method:

estimates radio environment data for each district based on the information for specifying the positions and the shapes of each of the buildings and information of a peripheral base station;

correlates the estimated radio environment data and the attribute information of each district read out from the map database, and extracts a district where the corresponding radio environment data indicates as a radio non-sensitive area and the attribute information that corresponds to the district;

correlates the use condition data read out from the use condition database and the attribute information read out from the map database based on the attribute information of each of the districts, and obtains a calculating equation for quantizing an effect that a communication company obtains from the radio communication system, by having parameters configuring the attribute information as explanatory variables; and calculates the effect that the communication company obtains from each of the districts by making each of the districts extracted as the radio non-sensitive area into a service area of the radio communication system based on the parameters of the attribute information of each of the districts extracted as the radio non-sensitive area and the calculating equation; and applies a priority order for taking a radio non-sensitive area countermeasure on each of the districts extracted as the radio non-sensitive area in accordance with degrees of the obtained effects.

As in this case where the radio environment data for each district is estimated based on the information specifying the position and the shape of each building and the information of the peripheral base station, the radio environment database is not required.

Like the above-described case, the scale of the district as an individual evaluation target within the search-target area is determined optionally. For example, it is possible to handle each building as a single district.

As the method for estimating the radio environment data for each district or each building based on the information specifying the position and the shape of each building and the information of the peripheral base station, it is possible to use a radio propagation simulation to which the ray tracing method is employed.

Furthermore, through displaying the priority order for taking the radio non-sensitive area countermeasure with highlight on a map of the search-target area in different colors or the like for clarifying the priority order, the district that needs to take the non-sensitive area countermeasure can be specified still more efficiently.

The highlight display using the map is especially suited for grasping the distribution of the radio non-sensitive area, and it is convenient for determining the priority for taking the non-sensitive area countermeasure by considering the relations and the like between the adjacent districts.

As the use condition data registered to the use condition database, it is possible to use the log data (the number of call requests, the line hold time, or the like) which is obtained when the base station is used.

Further, it is desirable for the attribute information to include the tenant information for each building, e.g. the classification in terms of its usage (such as restaurant and office), the total floor area, the user population, or the like. It is because those parameters are considered to have a large influence on the effect the communication company can obtain.

For the effect as the target of estimation, it is possible to use the communication charge profit amount the communication company can obtain through making and receiving calls via the communication system. The already-known communication charge profit amount, which is used for creating the calculating equation for quantizing the communication charge profit amount as the effect, may be obtained based on the use condition data such as the number of call requests or the line hold time. Alternatively, the communication charge profit amount itself may be registered in advance to the use condition database as one of the use condition data.

In order to achieve the similar object as the one mentioned above, a search system of the present invention is configured to include:

a radio environment database that stores data for specifying each district within a search-target area and current radio environment data of the radio communication system in each of the districts in a correlated manner;

a digital map database that stores data for specifying each of the districts in map data including the search-target area and attribute information of each of the districts in a correlated manner;

a use condition database that stores use condition data of a district where it has already become possible to use the radio communication system or a radio communication system similar to the radio communication system, and attribute information that corresponds to the use condition data;

a non-sensitive area extracting device which reads the data of the map database and the data of the radio environment database to correlate the radio environment data read out from the radio environment database and the attribute information read out from the map database based on the data for specifying each of the districts, and extracts a district where the corresponding radio environment data indicates as a radio non-sensitive area and the attribute information that corresponds to the district;

an effect quantization equation creating device which reads the data of the map database and the data of the use condition database to correlate the use condition data read out from the use condition database and the attribute information read out from the map database based on the attribute information of each of the districts, and creates a calculating equation for quantizing an effect that a communication company obtains from the radio communication system, by having parameters configuring the attribute information as explanatory variables; and an effect quantizing device which calculates the effect that the communication company obtains from each of the districts by making each of the districts extracted by the non-sensitive area extracting device as the radio non-sensitive area into a service available district of the radio communication system based on the parameters of the attribute information of each of the districts extracted as the radio non-sensitive area and the calculating equation generated by the effect quantization equation creating device, and applies an priority order for taking a radio non-sensitive area countermeasure on each of the districts extracted as the radio non-sensitive area in accordance with degrees of the obtained effects.

In the above-described structure, the non-sensitive area extracting device reads the data of the map database and the data of the radio environment database to correlate the radio environment data read out from the radio environment database and the attribute information read out from the map database based on the data for specifying each of the districts within the search-target area, and extracts all the districts where the corresponding radio environment data indicates as the radio non-sensitive area and all the attribute information that corresponds to the districts.

Meanwhile, the effect quantization equation creating device reads the data of the map database and the data of the use condition database to correlate the use condition data read out from the use condition database and the attribute information read out from the map database based on the attribute information of each of the districts, and generates the calculating equation for quantizing the effect that the communication company obtains from the radio communication system, by having the parameters configuring the attribute information as explanatory variables. For generating the calculating equation, the known principle component analysis, the factor analysis, or the like can be applied.

Then, the effect quantizing device calculates, all the effects (by each district) that the communication company obtains from each of the districts by making each of the districts extracted by the non-sensitive area extracting device as the radio non-sensitive area into a service available district of the radio communication system based on the parameters of the attribute information of each of the districts extracted as the radio non-sensitive area and the calculating equation generated by the effect quantization equation creating device, and applies the priority order for taking a radio non-sensitive area countermeasure on each of the districts extracted as the radio non-sensitive area in accordance with the degrees of the obtained effects.

Like the above-described case, the scale of the district as an individual evaluation target within the search-target area is determined optionally. For example, it is possible to handle each building as a single district.

Further, in order to achieve the similar object as the one mentioned above, a search system of the present invention may be configured to include:

a digital map database that stores information for specifying positions and shapes of buildings within a search-target area and attribute information of each district within the search-target area in a correlated manner;

a use condition database that stores use condition data of a district where it has already become possible to use the radio communication system or a radio communication system similar to the radio communication system, and attribute information that corresponds to the use condition data:

a radio environment estimating device which reads the data of the map database and information of a peripheral base station inputted from outside, and estimates radio environment data for each district based on the information for specifying the positions and the shapes of each of the buildings and the information of the peripheral base station;

a non-sensitive area extracting device which correlates the radio environment data estimated by the radio environment estimating device and the attribute information of each district readout from the map database, and extracts a district where the corresponding radio environment data indicates as a radio non-sensitive area and the attribute information that corresponds to the district;

an effect quantization equation creating device which reads the data of the map database and the data of the use condition database to correlate the use condition data read out from the use condition database and the attribute information read out from the map database based on the attribute information of each of the districts, and creates a calculating equation for quantizing an effect that a communication company obtains from the radio communication system, by having parameters configuring the attribute information as explanatory variables; and an effect quantizing device which calculates the effect that the communication company obtains from each of the districts by making each of the districts extracted by the non-sensitive area extracting device as the radio non-sensitive area into a service available district of the radio communication system based on the parameters of the attribute information of each of the districts extracted as the radio non-sensitive area and the calculating equation generated by the effect quantization equation creating device, and applies an priority order for taking a radio non-sensitive area countermeasure on each of the districts extracted as the radio non-sensitive area in accordance with degrees of the obtained effects.

When such structure is employed, the radio environment database is not required. Instead, the radio environment estimating device reads the data of the map database and the information of the peripheral base station inputted from the outside, and estimates the radio environment data for each district based on the information for specifying the positions and the shapes of each building stored in the map database and the information of the peripheral base station. As the method for estimating the radio environment data, it is possible to use a radio propagation simulation to which the ray tracing method is applied.

Like the above-described case, the scale of the district as an individual evaluation target within the search-target area is determined optionally. For example, it is possible to handle each building as a single district.

In order to achieve the similar object as the one mentioned above, a search program of the present invention is configured to allow a computer, which is accessible to a radio environment database that stores data for specifying each district within a search-target area and current radio environment data of the radio communication system in each of the districts in a correlated manner and accessible to digital map database that stores data for specifying each of the districts in map data including the search-target area and attribute information of each of the districts in a correlated manner, to function as a non-sensitive area extracting device which reads the data of the map database and the data of the radio environment database to correlate the radio environment data read out from the radio environment database and the attribute information read out from the map database based on the data for specifying each of the districts, and extracts a district where the corresponding radio environment data indicates as a radio non-sensitive area and the attribute information that corresponds to the district. At the same time, the program allows a computer, which is accessible to the map database and a use condition database that stores use condition data of a district where it has already become possible to use the radio communication system or a radio communication system similar to the radio communication system, and attribute information that corresponds to the use condition data, to function as an effect quantization equation creating device which reads the data of the map database and the data of the use condition database to correlate the use condition data read out from the use condition database and the attribute information read out from the map database based on the attribute information of each of the districts, and creates a calculating equation for quantizing an effect that a communication company obtains from the radio communication system, by having parameters configuring the attribute information as explanatory variables. Further, the program allows a computer, which is accessible to the non-sensitive area extracting device and the effect quantization equation creating device, to function as an effect quantizing device which calculates the effect that the communication company obtains from each of the districts by making each of the districts extracted as the radio non-sensitive area by the non-sensitive area extracting device into a service available district of the radio communication system based on the parameters of the attribute information of each of the districts extracted as the radio non-sensitive area and the calculating equation generated by the effect quantization equation creating device, and applies an priority order for taking a radio non-sensitive area countermeasure on each of the districts extracted as the radio non-sensitive area in accordance with degrees of the obtained effects.

The computer to which the search program is installed functions as the non-sensitive area extracting device, the effect quantization equation creating device, and the effect quantizing device, which configure the main part of the above-described search system.

For this, the number of the computers is not an issue (there may be a single or a plurality of computers used therein). For example, if there is a computer accessible to all of the radio environment database, the map database, and the use condition database, it is possible to have the single computer function as the non-sensitive area extracting device, the effect quantization equation creating device, and the effect quantizing device.

In this case, each of the databases may all be provided inside a single large-capacity hard disk or the like that is connected to the computer, or respective hard disks or the like of each of the databases may be connected through the use of a disk array system or the like.

Further, in the case where a file server is provided to each of the radio environment database, the map database, and the use condition database to transmit and receive data within a network, it is possible to assign the function of the non-sensitive area extracting device to a computer that is accessible to the radio environment database and the map database, assign the function of the effect quantization equation creating device to a computer that is accessible to the use condition database and the map database, and assign the function of the effect quantizing device to a computer that is different from those computers.

The number of computers and the assignment of each function are merely the matters in terms of the design.

Further, in order to achieve the similar object as the one mentioned above, a search program of the present invention is configured to allow a computer, which is accessible to a digital map database that stores information for specifying positions and shapes of buildings within a search-target area and attribute information of each district in a correlated manner, and is provided with a data input device, to function as a radio environment estimating device which reads the data of the map database and information of a peripheral base station inputted from the data input device, and estimates radio environment data for each district based on the information for specifying the positions and the shapes of each of the buildings and the information of the peripheral base station. At the same time, the program allows a computer, which is accessible to the map database and the radio wave environment estimating device, to function as a non-sensitive area extracting device which correlates the radio environment data estimated by the radio environment estimating device and the attribute information of each district read out from the map database, and extracts a district where the corresponding radio environment data indicates as a radio non-sensitive area and the attribute information that corresponds to the district. Further, the program allows a computer, which is accessible to the map database and a use condition database that stores use condition data of a district where it has already become possible to use the radio communication system or a radio communication system similar to the radio communication system, and attribute information that corresponds to the use condition data, to function as an effect quantization equation creating device which reads the data of the map database and the data of the use condition database to correlate the use condition data read out from the use condition database and the attribute information read out from the map database based on the attribute information of each of the districts, and generates a calculating equation for quantizing an effect that a communication company obtains from the radio communication system, by having parameters configuring the attribute information as explanatory variables. Furthermore, the program allows a computer, which is accessible to the non-sensitive area extracting device and the effect quantization equation creating device, to function as an effect quantizing device which calculates the effect that the communication company obtains from each of the districts by making each of the districts extracted as the radio non-sensitive area into a service available district of the radio communication system based on the parameters of the attribute information of each of the districts extracted as the radio non-sensitive area and the calculating equation generated by the effect quantization equation creating device, and applies an priority order for taking a radio non-sensitive area countermeasure on each of the districts extracted as the radio non-sensitive area in accordance with the degrees of the obtained effects.

The computer to which the search program is installed functions as the radio environment estimating device, the non-sensitive area extracting device, the effect quantization equation creating device, and the effect quantizing device, which configure the main part of the above-described search system. Like the above-described cases, the number of computers and the assignment of each function are merely the matters in terms of the design.

Like the above-described cases, the scale of the district as an individual evaluation target within the search-target area is determined optionally. For example, it is possible to handle each building as a single district.

With the present invention as described above, the effects the communication company can obtain by taking the non-sensitive area countermeasure are quantized, and the priority order is applied to the non-sensitive buildings based on the quantized effects. This makes it possible for the communication company to lighten the effort and time when selecting the building to apply the countermeasure among the number of non-sensitive buildings. Therefore, it is possible to improve the efficiency of the work for designing a radio access network from the search for the non-sensitive area to determining the establishment of a base station.

BEST MODES FOR CARRYING OUT THE INVENTION

Best modes for carrying out the present invention will be described by referring to the drawings. FIG. 1 is a block diagram illustrating about outlines of the functions of a search system (radio non-sensitive area search system) that is achieved by a computer to which a search program (radio non-sensitive area search program) for carrying out a search method (radio non-sensitive area search method) of the present invention is installed.

As shown in FIG. 1, the search system 1 according to this exemplary embodiment includes a radio environment database 2, a map database 3, a use condition database 4, a non-sensitive area extracting device 5, an effect quantization equation creating device 6, and an effect quantizing device 7.

As described in the section of "Means for Solving the Problems", when there is a computer that is capable of making accesses to all of the radio environment database 2, the map database 3, and the use condition database 4, it is possible to have a single computer function as the non-sensitive area extracting device 5, the effect quantization equation creating device 6, and the effect quantizing device 7. In that case, each of the databases 2, 3, and 4 may all be provided inside a single large-capacity hard disk or the like that is connected to the computer. Alternatively, respective hard disks or the like of each of the databases 2, 3, and 4 may be connected through the use of a disk array system or the like. Further, in the case where a file server is provided to each of the radio environment database 2, the map database 3, and the use condition database 4 to transmit and receive data within a network, it is possible to assign the function of the non-sensitive area extracting device 5 to a computer that is accessible to the radio environment database 2 and the map database 3, assign the function of the effect quantization equation creating device 6 to a computer that is accessible to the use condition database 4 and the map database 3, and assign the function of the effect quantizing device 7 to a computer that is different from those computers.

As a way of example, explanations hereinafter are provided assuming that the function of the non-sensitive area extracting device 5 is assigned to a computer C1 that is accessible to the radio environment database 2 and the map database 3, the function of the effect quantization equation creating device 6 is assigned to a computer C2 that is accessible to the use condition database 4 and the map database 3, and the function of the effect quantizing device 7 is assigned to a computer C3 that is different from those computers.

Therefore, in that case, a program for achieving the function of the non-sensitive area extracting device 5 is installed to the computer C1, a program for achieving the function of the effect quantization equation creating device 6 is installed to the computer C2, and a program for achieving the function of the effect quantizing device 7 is installed to the computer C3, so that those programs in combination function as the search program as a whole. Further, at least between the computer C1 and the computer C3, and between the computer C2 and computer C3 need to be connected through various kinds of network such as an in-house network or the Internet to be able to transmit information.

Needless to say, there are other various forms that can be considered regarding the number of computers and assignment of each function. However, the number of computers and the assignment of each function are merely the matters in terms of the design, and the technical spirit of the present invention can be applied regardless of the number of computers, assignment of each function, and the like.

FIG. 2 is a functional block diagram illustrating the schematic structure of the computers C1, C2, and C3. Each of the computers C1, C2, and C3 includes a microprocessor (simply referred to as a CPU, hereinafter) 8, a ROM 9 that stores a basic control program of the CPU 8, a RAM 10 used for temporal storage and the like of operational data, a hard disk drive 11 for storing a control program functioning as an operating system, various user programs, and the like, an interface 12 for connecting to various networks and external devices, and the like. A keyboard 14, a monitor 15, a printer 16, and the like functioning as man-to-machine interfaces are connected to the CPU 8 via an input/output circuit 13.

It is assumed that the program for achieving the function of the non-sensitive area extracting device 5 is installed in advance to the hard disk drive 11 of the computer C1 as one of the user programs. Similarly, the program for achieving the function of the effect quantization equation creating device 6 is installed in advance to the hard disk drive 11 of the computer C2, and the program for achieving the function of the effect quantizing device 7 is installed in advance to the hard disk drive 11 of the computer C3.

The radio environment database 2 shown in FIG. 1 stores radio environment data that covers at least the areas that are the targets of the search for non-sensitive areas (simply referred to as a search-target area hereinafter). The radio environment data is the data obtained by an actual measurement, estimation of propagation, or the like performed at a plurality of points within the search-target area.

An example of the data used as the radio environment data is the data with which the area, from which the data is obtained, can be judged as a non-sensitive area or not, such as received signal code power of a downstream common pilot channel.

Coordinate information that is the data for specifying the district within the search-target area is correlated to the respective radio environment data. Not only a widely-used coordinate system but also an original coordinate system may be employed for the coordinate system used herein. However, when using the original coordinate system, it is necessary to make clear the correspondence relation with respect to the coordinate system used in the map database 3 that will be described later. Radio environment data 17 for the inside the search-target area is supplied from the radio environment database 2 to the computer C1, i.e. the non-sensitive area extracting device 5, along with the coordinates as the data for specifying the district.

The map database 3 stores digital map data of buildings that are built within the search-target area. The digital map data contains geographical information/shape information of the buildings and attribute information of each building.

The geographical information of a building herein means the information for specifying a position of the building within the search-target area, such as latitude/longitude, coordinates, and the like of the position where the building is built. Further, the shape information of the building is the information that can specify the three-dimensional structure of the building, such as the shape, the height (storey), and the like of the building. Furthermore, the attribute information of the building contains the name of the building, the address, the name of the owner, the name of the user (tenant), layer information (storey information) on the map, and the like. It is unnecessary to store the attribute information of all the buildings. However, it is desirable to store the attribute information at least for the buildings that are possible to have some kinds of non-sensitive area countermeasure applied thereon. The map database 3 can be configured easily by utilizing a digital map that can be found on the market in general.

A digital map data 18 of the buildings within the search-target area is supplied from the map database 3 to the computer C1, i.e. the non-sensitive area extracting device 5.

Further, attribute information 19 of the building to which the non-sensitive area countermeasure is already being applied is supplied from the map database 3 to the computer C2, i.e. the effect quantization equation creating device 6. It is noted that the information itself regarding whether or not the non-sensitive area countermeasure has been taken can be stored as one of the attribute information of the building.

The use condition database 4 stores the use condition data indicating the use condition of mobile phones in the building to which the non-sensitive area countermeasure has already been taken. There are various forms considered as the use condition data. One of the forms may be base station working data such as the number of call requests, line hold time, or the like in the base station that is placed indoors. As the base station working data herein, the data for a third-generation mobile phone system that is a radio communication system as a target of the search may be used. Alternatively, the data for a second-generation radio communication system or a system of an earlier generation, which is a radio communication system similar to the third-generation system, may also be used.

Particularly, when an indoor base station for the second-generation system is placed in a building that is non-sensitive area for the third-generation system, the mobile phone use condition in the building can be grasped directly, and it is considered that there is a correlation between the effect that is already being generated by the non-sensitive area countermeasure applied for the second-generation system and the effect that is to be generated by a non-sensitive area countermeasure for the third-generation system, which may possibly be taken thereafter. Thus, it is highly possible that the effect generated by taking the non-sensitive area countermeasure for the third-generation system can be quantized properly from the already-known data of the second-generation system.

Another form of the use condition data may be actual measurement data that is measured within the building whose inside is within the service range of the mobile phones. Specifically, a received signal code power of an upstream signal that is measured at a plurality of points within the building is used to grasp the use condition in the peripheral areas of the observed points according to the magnitude of the power. Still another form of the use condition data may be the data that is obtained by a direct survey of the use condition, such as a questionnaire survey done on the user. Specifically, used may be the data indicating how often mobile phones are used in a unit time within each building, the data with which the use condition for each kind of tenants such as an office and a restaurant can be grasped, etc.

In the use condition database 4, such use condition data is stored by being related to the attribute information that can be searched by using the digital map data of the above-described map database 3, which is the attribute information required for specifying the place where each of the use condition data is collected, e.g. geographical information of the building, the name, the address, and the like. Such information 20 is supplied to the computer C2, i.e. the effect quantization equation creating device 6.

Then, the non-sensitive area extracting device 5 configured with the computer C1 extracts the non-sensitive building that exists within the search-target area by using the radio environment data 17 that is supplied from the radio environment database 2 and the digital map data 18 that is supplied from the map database 3.

Specifically, the coordinates as the data for specifying the position of the building (evaluation-target building) within the search-target area are extracted from the geographical information/shape information of the building from the digital map data 18, and the radio environment inside the evaluation-target building is checked by using the radio environment data 17 of the corresponding position. Further, it is judged whether or not the evaluation-target building is a non-sensitive building by using the radio environment. When there is no radio environment data for the inside of the evaluation-target building, a value obtained by applying a certain attenuation to the radio environment data of the outer side that is closest to that building may be considered as the radio environment of the inside the building. The typical value for the amount of attenuation is about 10 dB-20 dB. Inversely, when there are a plurality of pieces of radio environment data 17 for the inside of the evaluation-target building, the mean value or the worst value may be taken as the representative value. Alternatively, it is also possible to calculate the proportion of the data that is judged as the non-sensitive area among the plurality of pieces of data as the non-sensitive area ratio, and to judge whether or not the building is within the non-sensitive area based on the non-sensitive ratio. The judgment reference herein depends on what level of the radio condition the communication company considers as the non-sensitive area. However, when the radio environment data is a received signal code power of the downstream common pilot channel, for example, a value of about −100 dBm may be employed as the reference value for judgment.

The non-sensitive area extracting device 5 supplies information 21 of all the extracted non-sensitive buildings to the effect quantizing device 7 that is configured with the computer C3. The non-sensitive building information 21 contains the attribute information of the buildings and the radio environment data.

The effect quantization equation creating device 6 creates a calculating equation for quantizing the effect for the communication company that is obtained by taking the non-sensitive area countermeasure for the building to which an indoor non-sensitive area countermeasure has already been applied, by using the attribute information 19 supplied from the database 3 regarding the building to which the non-sensitive area countermeasure has been applied, and the use condition data 20 supplied from the use condition database 4.

The effect the communication company obtains herein may be a profit of communication charges generated by communications performed through mobile telephones within the building to which the non-sensitive area countermeasure has been applied, for example.

Described in the followings is the process for finding a calculating equation for quantizing the profit based on the attribute information by the effect quantization equation creating device 6.

First, the attribute information 19 of the building to which the non-sensitive area countermeasure has been applied is correlated to the use condition data 20 to create a data table 22 as shown in FIG. 3, for example, based on the attribute information for specifying the collected places of each use condition data contained in the use condition data 20 that is supplied form the use condition database 4 and the information for specifying the positions of the buildings contained in the attribute information 19 that is supplied from the map database 3.

The first column of the data table 22 shows a list of the buildings to which the indoor non-sensitive area countermeasure has already been applied, while the attribute information 19 such as the location of the buildings and the tenants, and the use condition data obtained from the use condition data 20 are correlated in the second column and thereafter. As the attribute information herein, used is the information that may have a high possibility to influence the profit as the effect, e.g. the data with which the sizes of each tenant occupying within the building, such as the total floor area, the user population, and the like of each tenant. FIG. 3 shows the case of using the floor area of each tenant within the building. As the use condition data 20, used is the data that can be correlated to the profit made with the communications that are performed via the base station, such as the number of call requests by mobile phones within the building, the line hold time, and the like. Alternatively, the profit at the base station may be calculated in advance, and that data may be included in the use condition data 20.

Then, the data table 22 is used to create a calculating equation for quantizing the profit that is a kind of the effect.

First, a parameter that has a large degree of contribution to the profit is derived by a principle component analysis or a factor analysis performed on the attribute information within the data table 22.

Then, a regression analysis is performed by having the parameter obtained thereby as an explanatory variable and the profit as a criterion variable so as to obtain an equation that approximates the profit with a linear model of the parameter. This equation is used as the calculating equation for quantizing the profit. Alternatively, the regression analysis may be performed by having one of the attribute information in the data table 22 as the explanatory variable, and this analysis itself may be used as the calculating equation for quantizing the profit.

For the effects the communication company can obtain, there are also improvements in the customer satisfaction, and the like in addition to the communication charge profit. In order to improve the customer satisfaction, it is necessary to expand the service available district of the radio communication system for the buildings of high publicness, such as the train stations, amusement facilities, and department stores. In order to reflect such publicness of each building upon the calculating equation for quantizing the effect, the publicness may be judged from the attribute information 19 of the corresponding building, a weighting coefficient may be determined in accordance with the degree of the publicness, and an equation obtained by multiplying the weighting coefficient to the above-described calculating equation for estimating the profit may be taken as a final calculating equation 23 for quantization in some cases. Alternatively, an equation where only the degree of the publicness is quantized may be prepared to be combined with the calculating equation 23 separately with respect to the calculating equation for estimating the profit. In addition to those methods, there are some other methods for obtaining the calculating equation for quantizing the effect. In any cases, it is effective to use at least the tenant information of the building that is considered to have a large influence upon the effect as the attribute information of the target building.

The methods for the principle component analysis, the factor analysis, the regression analysis, the computer processing and the like required for those are already known to the public through widely-distributed guides and the like of multivariate analysis.

The calculating equation 23 created by the effect quantization equation creating device 6 is supplied to the computer C3, i.e. the effect quantization device 7.

The effect quantizing device 7 quantizes the effect the communication company obtains from the building by applying the countermeasure to that non-sensitive building, by using the non-sensitive building information 21 extracted by the non-sensitive area extracting device 5 and the calculating equation 23 created by the effect quantization equation creating device 6.

Specifically, the calculating equation 23 that is obtained by having the attribute information of the building as a direct or an indirect explanatory variable is applied to the extracted non-sensitive building attribute information 21 so as to quantize the effect the communication company can obtain.

This quantization of the effect is performed respectively on all the non-sensitive buildings within the search-target area, and the priority order is applied in order from the larger quantized effect. The priority order is then outputted as a non-sensitive area search result 24 of the search-target area to the monitor 15 or the printer 16 of the computer C3 that configures the effect quantizing device 7.

Alternatively, the investment of the communication company needed for applying the non-sensitive area countermeasure to the building may be added to the quantized effect described above, and the priority order may be determined based on that result. The investment herein means the cost for providing the base station, the operation cost, and the like.

FIG. 4 and FIG. 5 illustrate examples of the non-sensitive area search result 24 obtained by the search system 1 of the exemplary embodiment.

In FIG. 4, all the non-sensitive buildings extracted within the search-target area are listed up in the priority order that is determined based on the quantized results described above. In the case of FIG. 4, the estimated profit is used as the effect obtained because of the non-sensitive area countermeasure.

Further, in FIG. 5, all the non-sensitive buildings extracted within the search-target area are displayed on a map in different colors according to the above-described quantized effects.

Through applying the priority order to the non-sensitive buildings based on the quantized effects as in FIG. 4, it becomes easier for the communication company to select the building to take the countermeasure among the number of non-sensitive buildings. Further, by displaying the non-sensitive buildings in different colors on the map according to the priority order as shown in FIG. 5, it becomes easier for the communication company to determine a specific plan for the non-sensitive area countermeasure and a means taken for the non-sensitive area countermeasure.

Next, examples of the internal processing of the computers C1, C2, and C3 functioning as the non-sensitive extracting device 5, the effect quantization equation creating device 6, and the effect quantizing device 7 will be described in a specific way by referring to flowcharts show in FIG. 6-FIG. 8.

FIG. 6 is a flowchart for showing the outline of the internal processing of the computer C1, FIG. 7 is a flowchart for showing the outline of the internal processing of the computer C2, and FIG. 8 is a flowchart for showing the outline of the internal processing of the computer C3. The programs for achieving such processing are stored in each of the hard disk drives 11, 11, 11 of the computers C1, C2, C3, which are unpacked as necessary on each of the RAMs 10, 10, 10 as the execution-target programs to be executed by the CPUs 8, 8, 8 of the respective computers C1, C2, C3.

When an operator inputs the information for designating the search-target area such as the name of the city, town, or village, and the lot number to the computer C1 that functions as the non-sensitive area extracting device 6 through operating the keyboard 14 of the computers C1, the computer C1 reads the information of the search-target area and stores it temporarily (step S101 of FIG. 6). Thereafter, the computer C1 accesses to the map database 3 to read the digital map data 18 of a single building within the search-target area (step S102). Further, the computer C1 accesses to the radio environment database 2 to search and read the radio environment data 17 that carries the information for specifying the position that corresponds to the geographical information of that digital map data 18 (step S103), and judges whether or not the radio environment data indicates the non-sensitive area (step S104-step S109).

Specifically, first, it is judged whether or not the radio environment data 17 carrying the information for specifying the position that substantially matches the position specifying information of the digital map data 18 that is read from the map database 3 is registered to the radio environment database 2 (step S104). When it is not registered, the radio environment data 17 carrying the specifying information of the position that is most approximate to the position specifying information of the digital map data 18 that is read this time is searched and obtained from the radio environment database 2 (step S106). Then, a value obtained by attenuating the received signal code power by about 10 dB-20 dB, for example, is taken as the received signal code power of that district (step S107), and it is judged whether or not the building is in the non-sensitive area (step S109) based on the fact that the obtained value has or has not reached the judgment reference value, −100 dBm.

Meanwhile, when a plurality of pieces of radio environment data 17 carrying the specifying information of the positions that substantially match the position specifying information of the digital map data 18 read from the map database 3 are detected from the radio environment database 2, i.e. when the judgment results of the step S104 and the step S105 both become true, the average of those received signal code powers is obtained to be taken as the received signal code power of that district, or the lowest value among those is taken as the received signal code power of that district (step S108) for example. Then, it is judged whether or not the building is within the non-sensitive area (step S109) based on the fact that the obtained value has or has not reached the judgment reference value, −100 dBm.

Further, when only one piece of radio environment data 17 carrying the specifying information of the position that substantially matches the position specifying information of the digital map data 18 read from the map database 3 is detected from the radio environment database 2, i.e. when the judgment result of the step S104 is true and that of the step S105 is false, it is considered that a proper received signal code power that corresponds to the position specifying information of the digital map data 18 is obtained directly, and it is judged whether or not the building is within the non-sensitive area (step S109) based on the fact that the obtained value has or has not reached the judgment reference value, −100 dBm.

When the non-sensitive building is detected while the judgment result of the step S109 is true, the position specifying information of that building in the digital map data 18 read at this point and the attribute information thereof is temporarily stored to the RAM 10 of the computer C1 (step S110), and it is judged whether or not there exists the digital map data 18 of other building that belongs to the search-target area defined in the step S101 within the map database 3 (step S111).

Further, when the judgment result of the step S109 becomes false, the processing of the step S110 is skipped and the judgment processing of the step S111 is executed in the same manner as that described above.

Then, when the judgment result of the step S111 becomes false, i.e. when it is judged that the digital map data 18 of other building that belongs to the search-target area exists in the map database 3, the computer C1 functioning as the non-sensitive area extracting device 5 shifts again back to the processing of the step S102 to read the digital map data 18 of another single building that belongs to the search-target area from the map database 3, and repeatedly executes the same processing as that described above for the digital map data 18.

Finally, at the point where the judgment result of the step S111 becomes true, the judgment processing of the non-sensitive area for all the buildings belonging to the search-target area is completed, and the position specifying information of the building that is judged as being within the non-sensitive area and the attribute information thereof (i.e. the non-sensitive building information 21) is stored to the RAM 10 of the computer C1.

At the point where the information 21 of all the non-sensitive buildings stored to the RAM 10 of the computer C1 is transferred to the computer C3 (step S112), the computer C1 ends the processing as the non-sensitive area extracting device 5.

Meanwhile, the computer C2 functioning as the effect quantization equation creating device 6 temporarily stores the search-target area that is designated by the operator through operating the keyboard 14 of the computer C2 (step S201 of FIG. 7). Thereafter, the computer C2 accesses to the map database 3 to collectively read the attribute information 19 of the buildings (to which the non-sensitive area countermeasure has been applied) within the search-target area (step S202). Further, the computer C2 reads all the use condition data 20 of each building to which the non-sensitive area countermeasure has been applied from the use condition database 4 based on the building position specifying information contained in each attribute information 19. Then, the attribute information 19 is correlated to the use condition data 20 on one-on-one basis so as to create the data table 22 as shown in FIG. 3 within the RAM 10 of the computer (step S203).

Then, a parameter (attribute information) that has a large degree of contribution to the profit is derived by a principle component analysis or a factor analysis performed on each of the attribute information within the data table 22 (step S204). Further, a regression analysis is performed by having the parameter obtained thereby as an explanatory variable and the profit as a criterion variable so as to obtain the equation 23 for quantizing the profit that approximates the profit with a linear model of the parameter (step S205).

The profit itself (already-known information) of the building to which the non-sensitive area countermeasure has been applied may be obtained by arithmetic processing from the values such as the number of call requests, the line hold time, or the like of the use condition data 20. Alternatively, the already-known data of the profit may be registered in advance as one of the use condition data 20 at the stage of creating the use condition data 20.

The computer C2 transfers the calculating equation 23 to the computer C3 (step S206), and ends the processing as the effect quantization equation creating device 6.

Meanwhile, the computer C3 starts the actual processing as the effect quantizing device 7 at the point of completing the reception and temporal storage of the non-sensitive building information that is transferred from the computer C1 and the reception and temporal storage of the calculating equation 23 that is transferred from the computer C2 (step S301-step S302 of FIG. 8).

First, the computer C3 reads, from the RAM 10 of the computer, the information 21 of a single non-sensitive building that is received from the computer C1 and stored (step S303). Then, the calculating equation 23 transferred from the computer C2 is applied to the attribute information of the information 21 of the non-sensitive building so as to quantize the estimated value of the profit, i.e. the effect the communication company can obtain from the building by turning the non-sensitive building into the service available district of the third-generation radio communication system (step S304). The estimated value of the profit is temporarily stored to the RAM 10 by being correlated to the non-sensitive building information 21 (step S305).

Then, the computer C3 judges whether or not the quantization of the effects has been completed for the information 21 of all the non-sensitive buildings stored in the RAM 10 of the computer (step S306). When the quantization of the effects has not been completed, the computer C3 returns again to the step S303 to read the information 21 of the next single non-sensitive building from the RAM 10, and repeatedly executes the same processing operation as that described above for the non-sensitive building information 21. With this, the computer C3 estimates the profit of each non-sensitive building, and temporarily store the results to the RAM 10 in addition by correlating those to the information 21 of the non-sensitive buildings successively.

Finally, at the point where the judgment result of the step S306 becomes true, quantization of the effects, i.e. estimation of the profit, for the information 21 of all the non-sensitive buildings supplied from the computer C1 is completed.

Then, the computer C3 sorts out the information 21 of the non-sensitive buildings in order from the larger estimated profit value, i.e. in order of the larger effect that can be obtained, based on the corresponding relation between the estimated results of the profits and the information 21 of the non-sensitive buildings so as to clarify the priority order for executing the non-sensitive area countermeasure (step S307). Then, the computer C3 outputs the sorted result to the monitor 15, the printer 16, or the like of the computer C3 in a list of the non-sensitive area search result 24 as shown in FIG. 4, for example (step S308).

Alternatively, it is possible to display the priority order for executing the non-sensitive area countermeasure by changing colors or the like on the map as shown in FIG. 5, by creating a map that shows the relative positional relations of each non-sensitive building within the search-target area based on the positional information and the shape information contained in the attribute information within the non-sensitive building information 21.

Here, the case of dispersing the functions of the non-sensitive area extracting device 5, the effect quantization equation creating device 6, and the effect quantizing device 7 to a plurality of computers has been described as a way of example. However, the functions of the non-sensitive area extracting device 5, the effect quantization equation creating device 6, and the effect quantizing device 7 may be achieved by a single computer.

In that case, it does not matter which of the processing (the processing of FIG. 6 and the processing of FIG. 7) is executed first. It is also possible to perform the both processing in parallel, and the processing of FIG. 8 is executed thereafter.

Further, it is not always essential for the extraction range of the digital map data and the use condition data used for generating the calculating equation 23 to match the search-target area that is the target for searching the non-sensitive area.

For example, there may be a possibility that the non-sensitive area countermeasures for the second-generation mobile phones or the radio communication system prior to that are not taken at all (no corresponding use condition data) in the search-target area. In such a case, it is theoretically possible to obtain the calculating equation 23 by utilizing the digital map data and the use condition data of another district that has similar condition of location, resident structure, and the like, and to estimate the effects such as the profits obtained from each building within the search-target area from that calculating equation 23.

Specifically, such processing operation can be achieved through inputting the information for designating another district that has the similar conditions, instead of inputting the actual search-target area in the processing of the step S201 shown in FIG. 7.

Next, another exemplary embodiment that includes a radio environment estimating device instead of the radio environment database will be described briefly by referring to FIG. 9.

This search system 25 includes a radio environment estimating device 26, a map database 3, a use condition database 4, a non-sensitive area extracting device 5, an effect quantization equation creating device 6, and an effect quantizing device 7.

Among those, the non-sensitive area extracting device 5, the effect quantization equation creating device 6, and the effect quantizing device 7 can be configured with computers C1, C2, and C3, which have the normal structure as in the case of the exemplary embodiment described earlier.

This exemplary embodiment enables estimation of the radio environment within the same system. Therefore, the radio environment estimating device 26 is used instead of the radio environment database 2 of the exemplary embodiment described earlier.

As the radio environment estimating device 26, it is possible to use an ordinal computer C4 having the equivalent structure as the structures of the above-described computers C1, C2, and C3, for example. In that case, a keyboard as the man-to-machine interface of the computer C4 functions as a data input device for inputting the information of the peripheral base stations, and the like.

The radio environment estimating device 26 estimates the radio environment within the search-target area by using digital map data 18' for the inside of the search-target area extracted from the map database 3 and the specifications of the base station inputted by an operator through the keyboard.

The digital map data 18' supplied from the map database 3 to the radio environment estimating device 26 contains elevation information for the inside of the search-target area, the geographical information/shape information of the building, and the like as the data required for estimating the radio environment.

The contents of the digital map data 18 supplied from the map database 3 to the non-sensitive area extracting device 5 are the same as those of the exemplary embodiment described earlier.

The specification of the base station inputted to the radio environment estimating device 26 includes the positional information of the base station, the transmission output of the common pilot channel, the directive pattern of the transmission antenna, the angles of each sector, and the like.

Further, in this exemplary embodiment, at least the inside of the evaluation-target building is considered as the target when estimating the radio environment. For the estimation, it is desirable to use a radio propagation simulation to which a ray tracing method is employed, in order to satisfy both the accuracy of the propagation estimation and the calculation time.

Radio environment data 17' obtained by the radio environment estimating device 26 through the radio propagation simulation with the use of the ray tracing method is supplied to the non-sensitive area extracting device 5 by being correlated to the coordinates which specify the positions within the search-target area.

The structures and the functions of the non-sensitive area extracting device 5, the effect quantization equation creating device 6, and the effect quantizing device 7 as well as the structure of the use condition database 4 are the same as those of the exemplary embodiment described earlier.

Each of the aforementioned exemplary embodiments has been specifically described by limiting the scale of the district as the individual evaluation target within the search-target area to a building. However, the scale of the district as the individual evaluation target can be determined optionally. For example, a district of some expanse such as a field of city block, numbered subdivision of address, town/village, or the like may be taken as the individual evaluation target.

In that case, the radio environment data 17 (for the case of using the radio environment database 2) or the radio environment data 17' (for the case of using the radio environment estimating device 26) is used to judge whether or not the individual evaluation-target district (a field of city block, numbered subdivision of address, town/village, or the like) that is obtained by geographically sectioning the search-target area is a non-sensitive area. Then, based on the attribute information of each district, the effect the communication company can obtain by applying the countermeasure to that district is quantized.

In that case, used as the attribute information is a set of the land usage information of the district (the type such as a street of office buildings, a campus, a theme park, a cultivated field, or the like), the building attribute information of the buildings within the district, and the like.

Further, it is not always essential for the scale of the district that is the individual evaluation target within the search-target area and the scale of the district in the attribute information to be stored in the map database 3 to be the same level. For example, it is possible to estimate the effect of the non-sensitive area countermeasure with a reasonable accuracy even if the scale of the district as the individual evaluation target within the search-target area is set as a building, for example, and the attribute information to be stored in the map database 3 is set as a district wider than the building (such as the attribute information corresponding to a filed of city block, numbered subdivision of address, town/village, or the like).

BRIEF DESCRIPTION OF THE DRAWINGS

FIG. 3 is a conceptual diagram illustrating an example of a data table that is used when obtaining a calculating equation for quantizing the effect;

FIG. 4 is a conceptual diagram illustrating an example of a result of searching a non-sensitive area;

DESCRIPTION OF SYMBOLS

Figure 1:
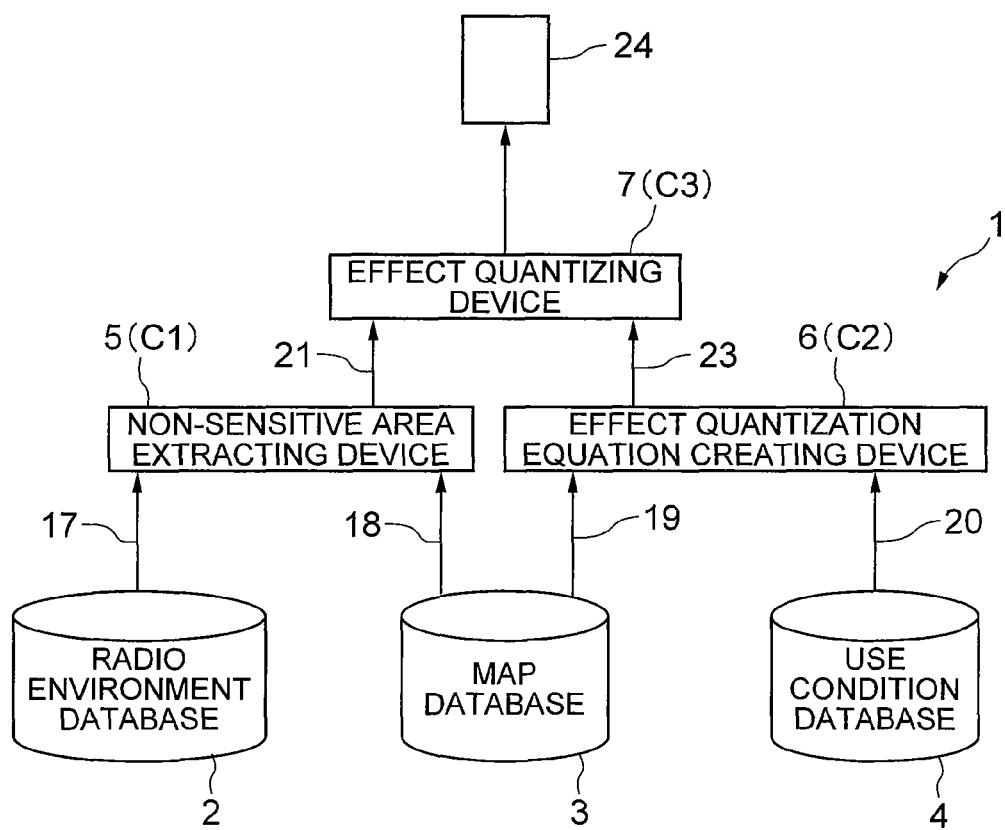
FIG. 1 is a functional block diagram illustrating a schematic structure of a search system that is achieved by a computer to which a search program for embodying a search method of the present invention is installed.
Figure 2:
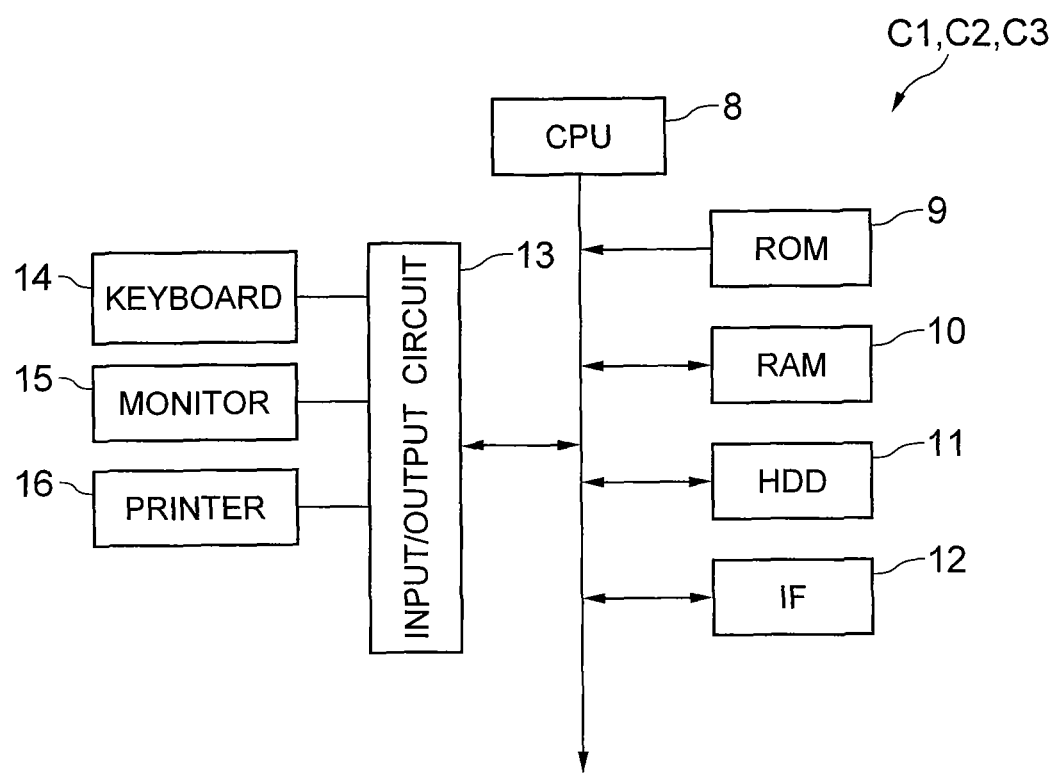
FIG. 2 is a functional block diagram illustrating a schematic structure of the computer that configures the search system.
Figure 5:
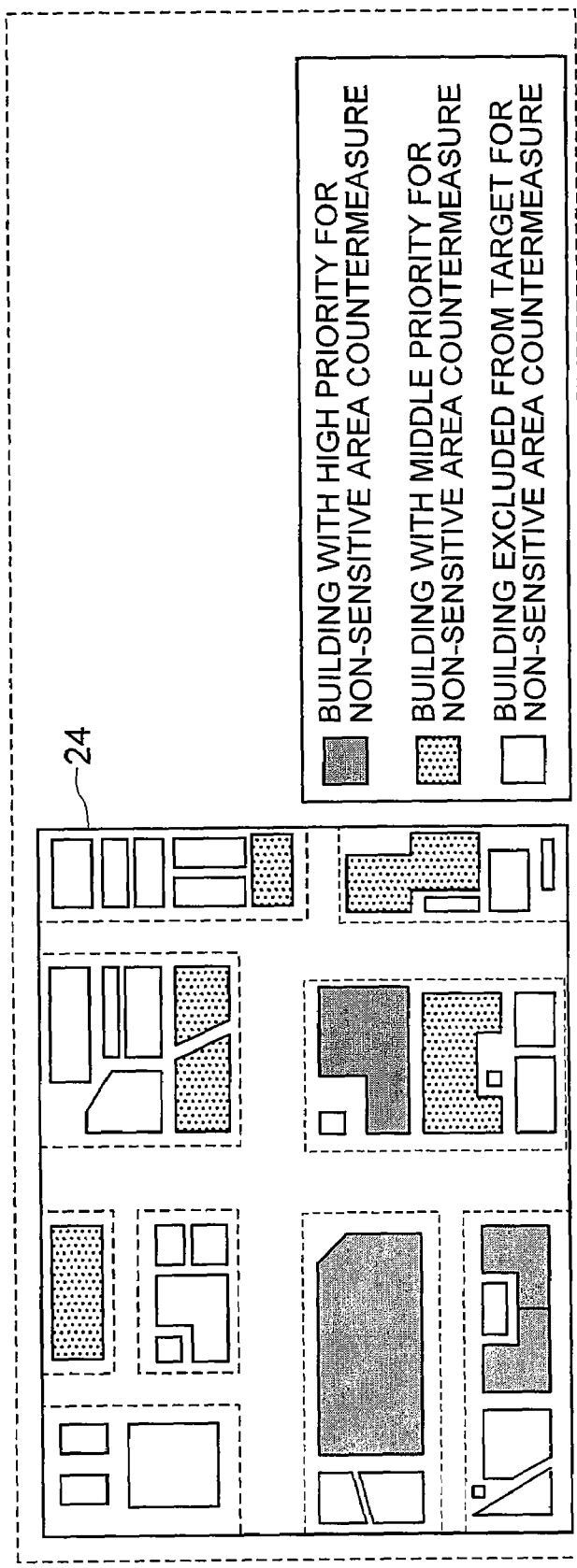
FIG. 5 is a conceptual diagram illustrating another example of the result of searching a non-sensitive area.
Figure 6:
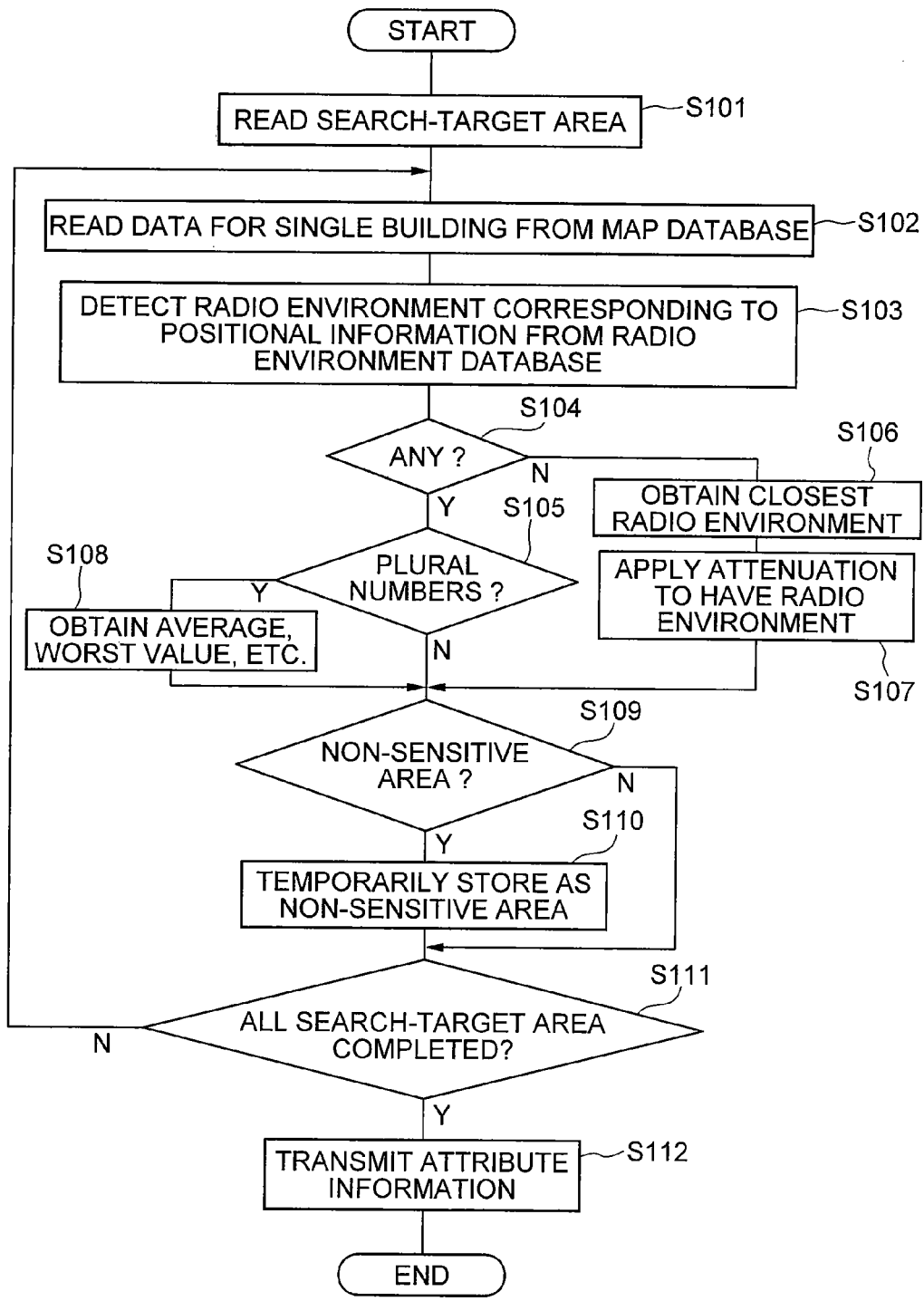
FIG. 6 is a flowchart illustrating an example of internal processing of a computer that functions as a non-sensitive area extracting device.
Figure 7:
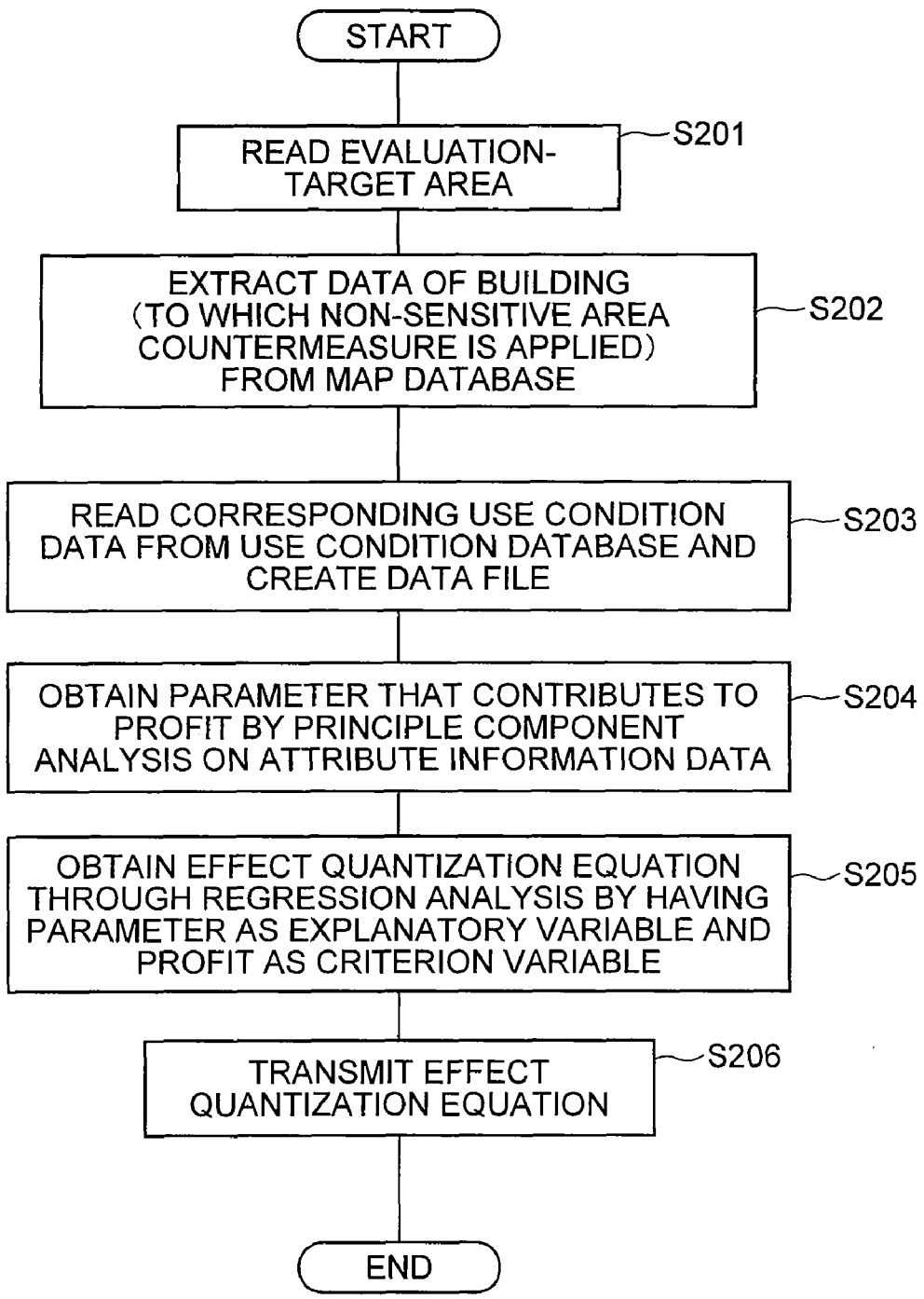
FIG. 7 is a flowchart illustrating an example of internal processing of a computer that functions as an effect quantization equation creating device.
Figure 8:
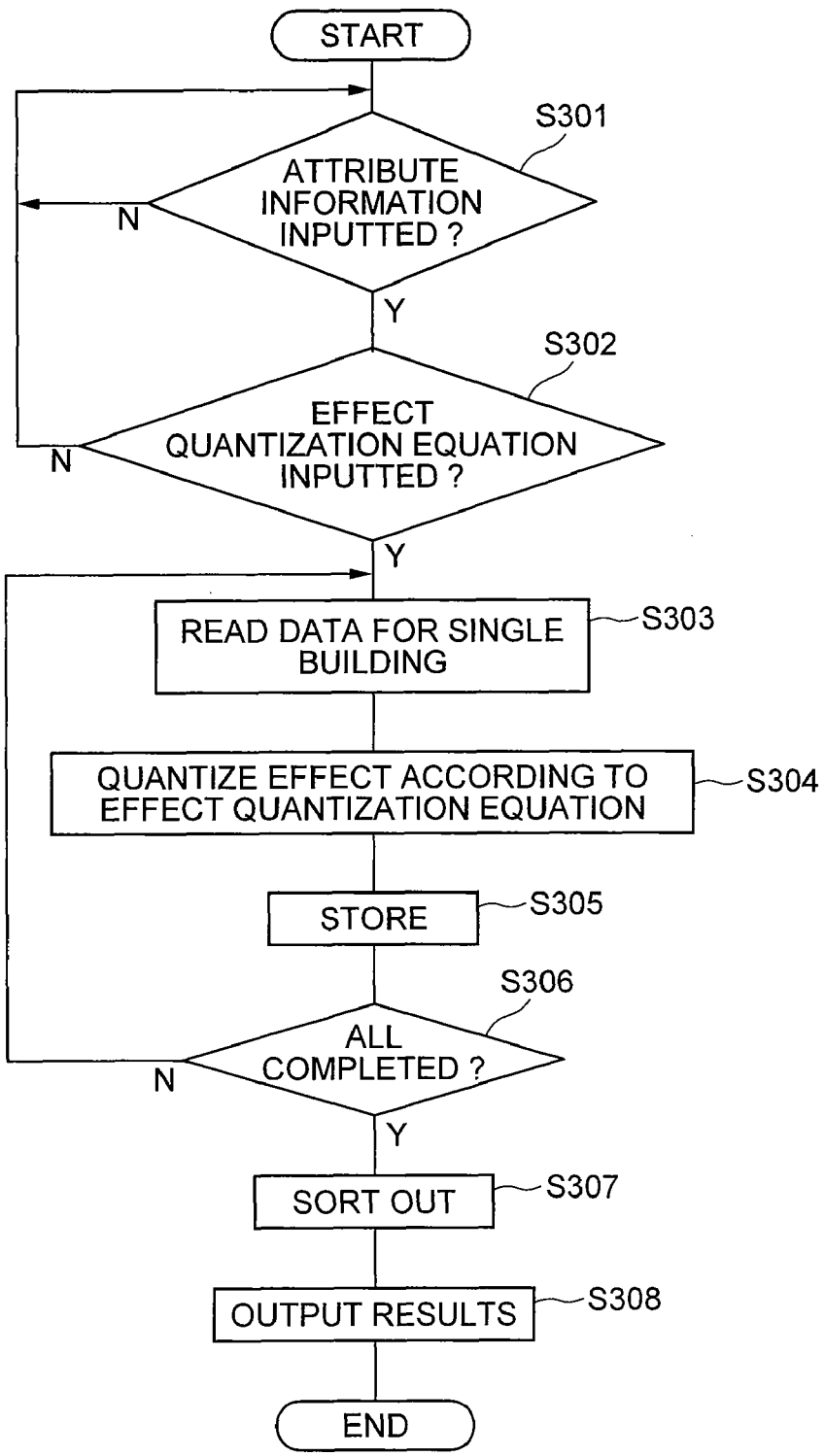
FIG. 8 is a flowchart illustrating an example of internal processing of a computer that functions as an effect quantizing device.
Figure 9:
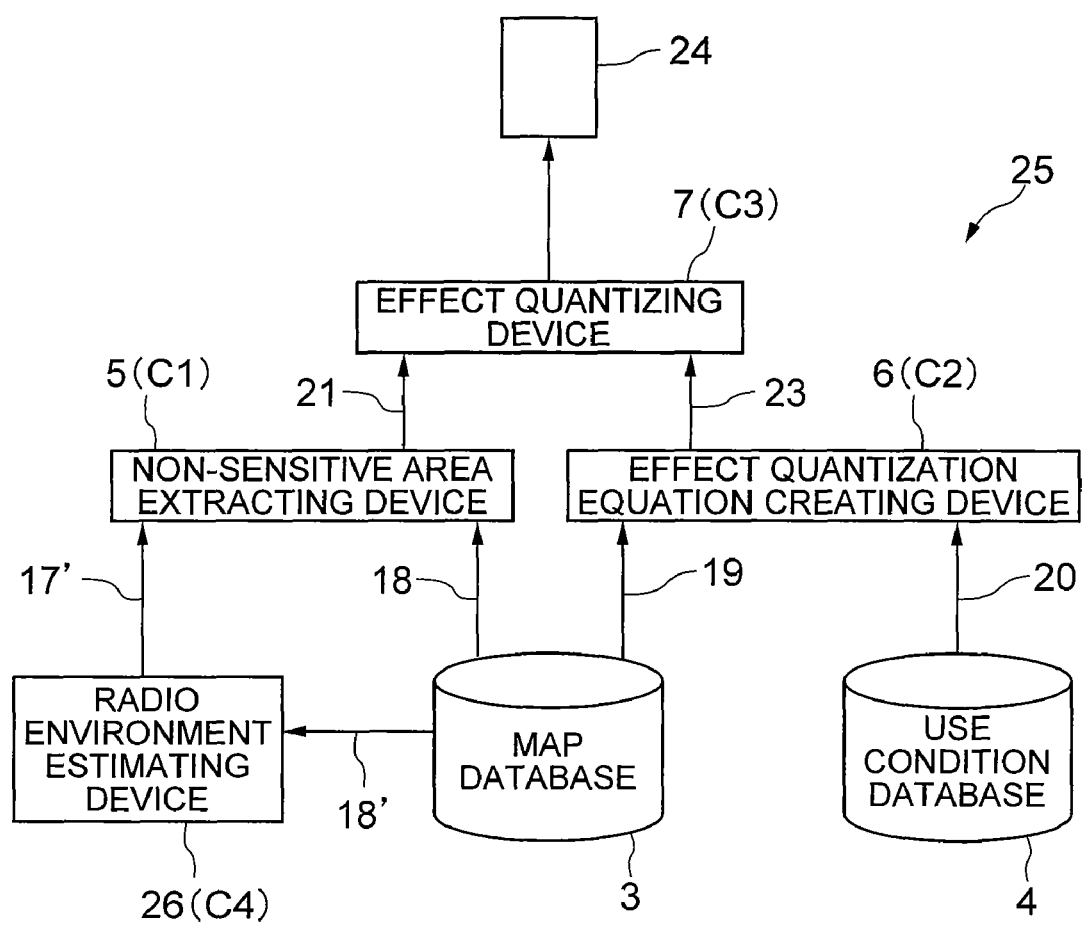
FIG. 9 is a functional block diagram illustrating another exemplary embodiment to which a radio environment estimating device that is used instead of a radio environment database.

1 Search system
2 Radio environment database
3 Map database
4 Use condition database
5 Non-sensitive area extracting device
6 Effect quantization equation creating device
7 Effect quantizing device
8 CPU
9 ROM
10 RAM
11 Hard disk drive
12 Interface
13 Input/output circuit
14 Keyboard
15 Monitor
16 Printer
17, 17' Radio environment data
18, 18' Digital map data
19 Attribute information of the building to which the non-sensitive area countermeasure is already being applied
20 Use condition data and the like
21 Non-sensitive building information
22 Data table
23 Calculating equation for quantizing the effect
24 Non-sensitive area search result
25 Search system
26 Radio environment estimating device
C1, C2, C3, C4 Computer While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No.2005-121109, filed on Apr. 19, 2005, the disclosure of which is incorporated herein in its entirety by reference.

The invention claimed is:

1. A search system for searching, within a spatially expanded evaluation-target area, a radio non-sensitive area where a radio wave of an already-provided radio communication system cannot reach sufficiently, the search system using as data used for the search, radio environment data, digital map data, and use condition data, wherein:

the radio environment data is current radio environment data of the radio communication system in the evaluation-target area, and each of the radio environment data is individually correlated to search targets within the evaluation-target area;

the digital map data is digital map data including the evaluation-target area, which contains individual area attribute information for the search targets; and the use condition data is use condition data of the radio communication system or a radio communication system similar to the radio communication system, and each of the use condition data is individually correlated to already-provided service areas as well as to parameters of attribute information of the search targets, the search system comprising:

a non-sensitive area extracting device which extracts the search targets and obtains the attribute information of the search targets by correlating the radio environment data to the attribute information of the search targets;

an effect quantization equation creating device which creates, using a processor, a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing device which calculates the effect that the communication company obtains by making the area where the search targets exist into its service area through applying the calculating equation to the extracted search targets, and applies an priority order for taking a search-target countermeasure on a plurality of the search targets extracted within the evaluation-target area based on the effects calculated individually.

2. The search system as claimed in claim 1, wherein the area attribute information contains at least one selected from a classification of its usage, total floor area, and user population, for each building.

3. The search system as claimed in claim 1, wherein the effect quantizing device displays the extracted search targets with highlight on a map of the evaluation-target area in accordance with the priority order set for taking a non-sensitive area countermeasure.

4. The search system as claimed in claim 1, wherein, as the use condition data, log data that is obtained when using a base station is employed.

5. The search system as claimed in claim 1, wherein buildings are set as the search targets, and tenant information for each building is included in the attribute information of the search targets.

6. The search system as claimed in claim 1, wherein, as data of the effect, data of a communication charge profit amount that the communication company can obtain by making an area where the search targets exist into its service area is used.

7. A non-transitory computer-readable medium containing a search program used in a computer that configures a search system for searching, within a spatially expanded evaluation-target area, a radio non-sensitive area where a radio wave of an already-provided radio communication system cannot reach sufficiently, the search program using, as input information:
   current radio environment data of the radio communication system in the evaluation-target area, each of the radio environment data being individually correlated to search targets within the evaluation-target area;
   digital map data including the evaluation-target area, which contains individual area attribute information for the search targets; and
   use condition data of the radio communication system or a radio communication system similar to the radio communication system, each of the use condition data being individually correlated to already-provided service areas as well as to parameters of attribute information of the search targets, the search program causing the computer to execute:
   a function which extracts the search targets and obtains the attribute information of the search targets by correlating the radio environment data to the attribute information of the search targets;
   a function which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and
   a function which calculates the effect that the communication company obtains by making the area where the search targets exist into its service area through applying the calculating equation to the extracted search targets, and applies an priority order for taking a search-target countermeasure on a plurality of the search targets extracted within the evaluation-target area based on the effects calculated individually.

8. The non-transitory computer-readable medium as claimed in claim 7, wherein the area attribute information contains at least one selected from a classification of its usage, total floor area, and user population, for each building.

9. A non-transitory computer-readable medium containing a search program used in a computer that configures a search system for searching, within a spatially expanded evaluation-target area, a radio non-sensitive area where a radio wave of an already-provided radio communication system cannot reach sufficiently, the search program using, as input information:
   digital map data including the evaluation-target area, which contains positional information and characteristic information for search targets that exist within the evaluation-target area and attribute information for each of the search targets within the evaluation-target area; and
   use condition data of the radio communication system or a radio communication system similar to the radio communication system, each of the use condition data being individually correlated to already-provided service areas as well as to parameters of attribute information of the search targets, the search program causing the computer to execute:
   a function which outputs radio environment data for the evaluation-target area through performing radio propagation estimation in the evaluation-target area by using the positional information and the characteristic information of the search targets;
   a function which extracts the search targets and obtains the attribute information of the search targets by correlating the radio environment data to the attribute information of the search targets;
   a function which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and
   a function which calculates the effect that the communication company obtains by making the area where the search targets exist into its service area through applying the calculating equation to the area where the extracted search targets exist, and applies an priority order for taking a search-target countermeasure on a plurality of the search targets extracted within the evaluation-target area based on the effects calculated individually.

10. A search system for searching, within a spatially expanded evaluation-target area, a radio non-sensitive area where a radio wave of an already-provided radio communication system cannot reach sufficiently, the search system using
   as data used for the search, digital map data, and use condition data, wherein:
   the digital map data is digital map data including the evaluation-target area, which contains positional information and characteristic information for search targets that exist within the evaluation-target area and attribute information for each of the search targets within the evaluation-target area; and
   the use condition data is use condition data of the radio communication system or a radio communication system similar to the radio communication system, and each of the use condition data is individually correlated to already-provided service areas as well as to parameters of attribute information of the search targets, the search system comprising:
   a radio environment estimating device which outputs radio environment data for the evaluation-target area through performing radio propagation estimation in the evaluation-target area by using the positional information and the characteristic information of the search targets;
   a non-sensitive area extracting device which extracts the search targets and obtains the attribute information of the search targets by correlating the radio environment data to the attribute information of the search targets;
   an effect quantization equation creating device which creates, using a processor, a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing device which calculates the effect that the communication company obtains by making the area where the search targets exist into its service area through applying the calculating equation to the area where the extracted search targets exist, and applies an priority order for taking a search-target countermeasure on a plurality of the search targets extracted within the evaluation-target area based on the effects calculated individually.

11. The search system as claimed in claim 10, wherein the radio environment estimating device performs the radio propagation estimation according to a ray tracing method.

12. The search system as claimed in claim 10, wherein the effect quantizing device displays the extracted search targets with highlight on a map of the evaluation-target area in accordance with the priority order set for taking a non-sensitive area countermeasure.

13. The search system as claimed in claim 10, wherein, as the use condition data, log data that is obtained when using a base station is employed.

14. The search system as claimed in claim 10, wherein buildings are set as the search targets, and tenant information for each building is included in the attribute information of the search targets.

15. The search system as claimed in claim 10, wherein, as data of the effect, data of a communication charge profit amount that the communication company can obtain by making an area where the search targets exist into its service area is used.

16. A search method for searching, within a spatially expanded evaluation-target area, a radio non-sensitive area where a radio wave of an already-provided radio communication system cannot reach sufficiently, the search method using as data used for the search, radio environment data, digital map data, and use condition data, wherein:

the radio environment data is selected as current radio environment data of the radio communication system in the evaluation-target area, each of the radio environment data being individually correlated to search targets within the evaluation-target area;

the digital map data is selected as digital map data including the evaluation-target area, which contains respective area attribute information for the search targets; and the use condition data is selected as use condition data of the radio communication system or a radio communication system similar to the radio communication system, each of the use condition data being individually correlated to already-provided service areas as well as to parameters of attribute information of the search targets, the search method comprising:

a non-sensitive area extracting step which extracts the search targets and obtains the attribute information of the search targets by correlating the radio environment data to the attribute information of the search targets;

an effect quantization equation creating step which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing step which calculates the effect that the communication company obtains by making the area where the search targets exist into its service area through applying the calculating equation to the extracted search targets, and applies an priority order for taking a search-target countermeasure on a plurality of the search targets extracted within the evaluation-target area based on the effects calculated individually.

17. The search method as claimed in claim 16, wherein the area property information contains at least one selected from a classification of its usage, total floor area, and user population.

18. A search method for searching, within a spatially expanded evaluation-target area, a radio non-sensitive area where a radio wave of an already-provided radio communication system cannot reach sufficiently, the search method using as data used for the search, digital map data, and use condition data, wherein:

the digital map data is set as digital map data including the evaluation-target area, which contains positional information and characteristic information for search targets that exist within the evaluation-target area and attribute information for each of the search targets within the evaluation-target area; and the use condition data is set as use condition data of the radio communication system or a radio communication system similar to the radio communication system, each of the use condition data being individually correlated to already-provided service areas as well as to parameters of attribute information of the search targets, the search method comprising:

a radio environment estimating step which outputs radio environment data for the evaluation-target area through performing radio propagation estimation in the evaluation-target area by using the positional information and the characteristic information of the search targets;

a non-sensitive area extracting step which extracts the search targets and obtains the attribute information of the search targets by correlating the radio environment data to the attribute information of the search targets;

an effect quantization equation creating step which creates a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing step which calculates the effect that the communication company obtains by making the area where the search targets exist into its service area through applying the calculating equation to the extracted search targets, and applies an priority order for taking a search-target countermeasure on a plurality of the search targets extracted within the evaluation-target area based on the effects calculated individually.

19. A search system for searching, within a spatially expanded evaluation-target area, a radio non-sensitive area where a radio wave of an already-provided radio communication system cannot reach sufficiently, the search system using as data used for the search, radio environment data, digital map data, and use condition data, wherein:

the radio environment data is current radio environment data of the radio communication system in the evaluation-target area, and each of the radio environment data is individually correlated to search targets within the evaluation-target area;

the digital map data is digital map data including the evaluation-target area, which contains individual area attribute information for the search targets; and the use condition data is use condition data of the radio communication system or a radio communication system similar to the radio communication system, and each of the use condition data is individually correlated to already-provided service areas as well as to parameters of attribute information of the search targets, the search system comprising:

a non-sensitive area extracting means for extracting the search targets and obtaining the attribute information of the search targets by correlating the radio environment data to the attribute information of the search targets;

an effect quantization equation creating means for creating, using a processor, a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing means for calculating the effect that the communication company obtains by making the area where the search targets exist into its service area through applying the calculating equation to the extracted search targets, and applying an priority order for taking a search-target countermeasure on a plurality of the search targets extracted within the evaluation-target area based on the effects calculated individually.

20. A search system for searching, within a spatially expanded evaluation-target area, a radio non-sensitive area where a radio wave of an already-provided radio communication system cannot reach sufficiently, the search system using as data used for the search, digital map data, and use condition data, wherein:

the digital map data is digital map data including the evaluation-target area, which contains positional information and characteristic information for search targets that exist within the evaluation-target area and attribute information for each of the search targets within the evaluation-target area; and the use condition data is use condition data of the radio communication system or a radio communication system similar to the radio communication system, and each of the use condition data is individually correlated to already-provided service areas as well as to parameters of attribute information of the search targets, the search system comprising:

a radio environment estimating means for outputting radio environment data for the evaluation-target area through performing radio propagation estimation in the evaluation-target area by using the positional information and the characteristic information of the search targets;

a non-sensitive area extracting means for extracting the search targets and obtaining the attribute information of the search targets by correlating the radio environment data to the attribute information of the search targets;

an effect quantization equation creating means for creating, using a processor, a calculating equation for quantizing an effect that a communication company obtains by making an area where the search targets exist into its service area, by having the parameters of the attribute information of the search targets as direct or indirect explanatory variables through correlating the use condition data to the attribute information of the search targets; and an effect quantizing means for calculating the effect that the communication company obtains by making the area where the search targets exist into its service area through applying the calculating equation to the area where the extracted search targets exist, and applying an priority order for taking a search-target countermeasure on a plurality of the search targets extracted within the evaluation-target area based on the effects calculated individually.

* * * * *